2 Sheets—Sheet 1.

J. HASLEM.

PLATE GLASS POLISHER.

No. 10,872. Reissued Oct. 11, 1887.

Witnesses:
L. L. Burket.
Edm. P. Ellis

Inventor
James Haslem.
per J. A. Lehmann
Att'y.

J. HASLEM.

PLATE GLASS POLISHER.

No. 10,872. Reissued Oct. 11, 1887.

Witnesses:
L. L. Burket,
Edm. P. Ellis

Inventor.
James Haslem,
per J. A. Lehmann,
atty

UNITED STATES PATENT OFFICE.

JAMES HASLEM, OF HOWELL, DAKOTA TERRITORY.

PLATE-GLASS POLISHER.

SPECIFICATION forming part of Reissued Letters Patent No. 10,872, dated October 11, 1887.

Original No. 349,430, dated September 21, 1886. Application for reissue filed September 8, 1887. Serial No. 249,161.

*To all whom it may concern:*

Be it known that I, JAMES HASLEM, a citizen of the United States, residing at Howell, in the county of Hand and Territory of Dakota, have invented certain new and useful Improvements in Plate-Glass Polishers, of which the following is a specification, reference being had therein to the accompanying drawings.

My invention relates to that class of machines for polishing plate glass which embody a frame or holder for the plate-glass, and mechanism for reciprocating the same in one direction, and reciprocating rubbers or polishers moving upon the glass in a transverse direction.

My invention consists in certain details of construction and operating mechanism in such machines, as hereinafter described, and particularly pointed out in the claims, whereby plate-glass may be smoothly, quickly, and safely polished.

Figure 1:
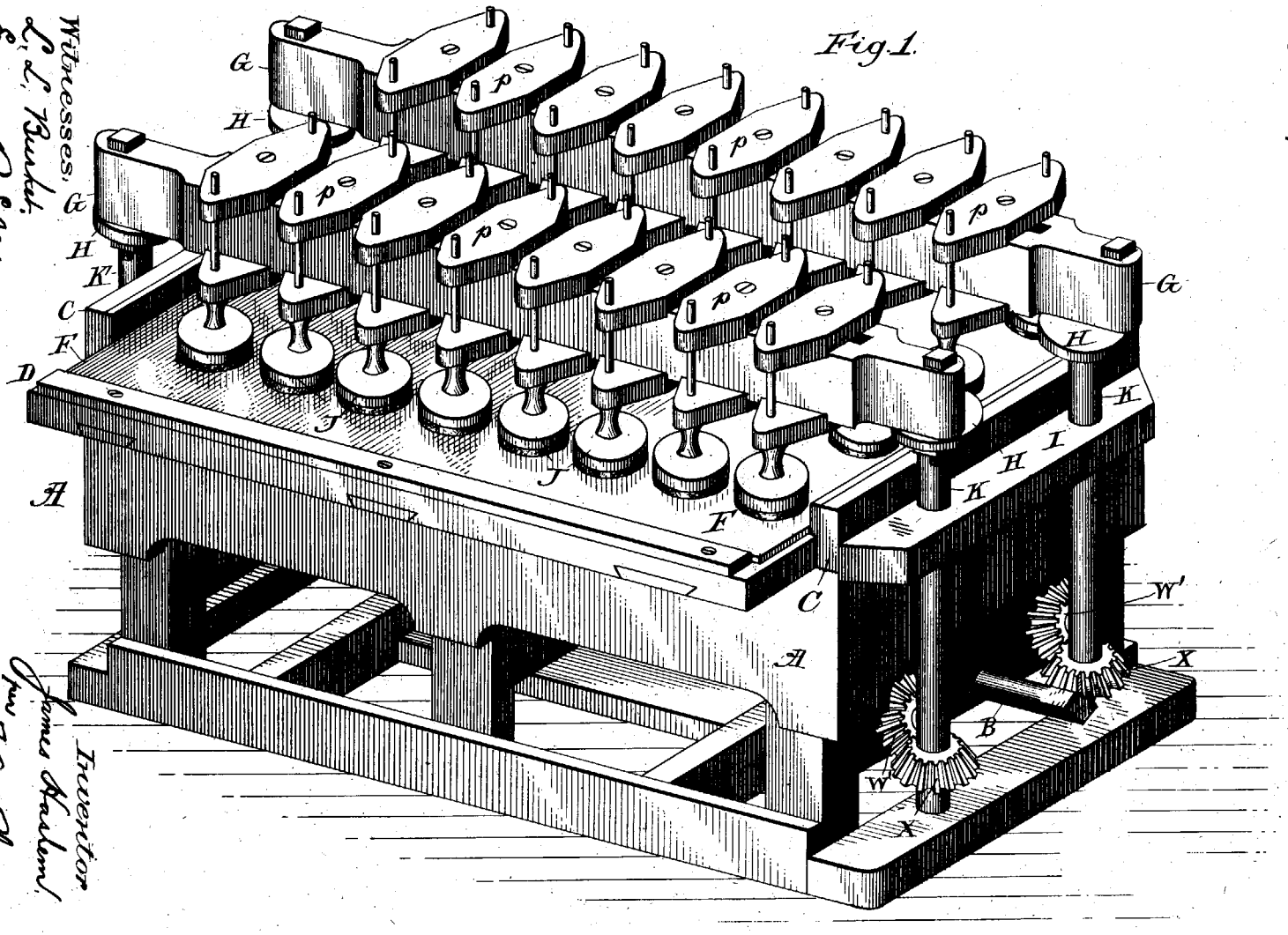
Figure 2:
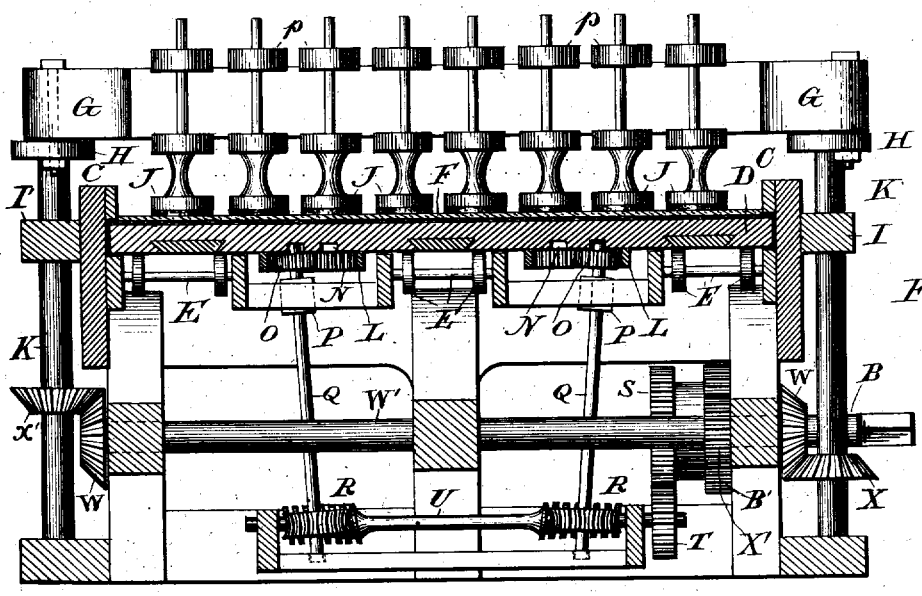
Figure 5:
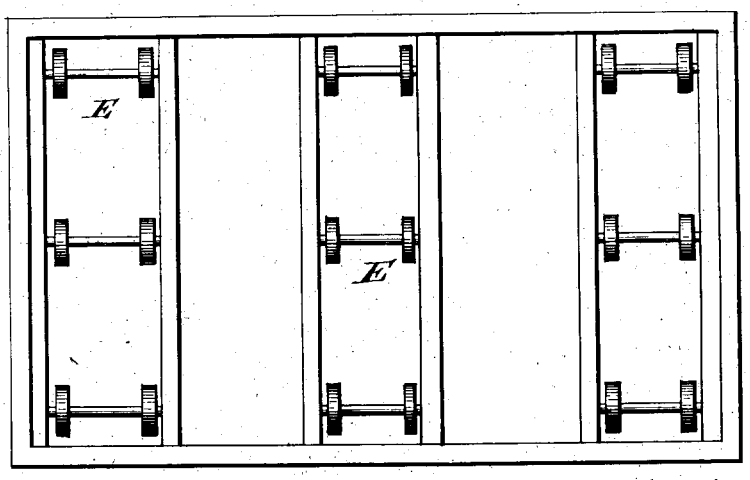
Figure 3:
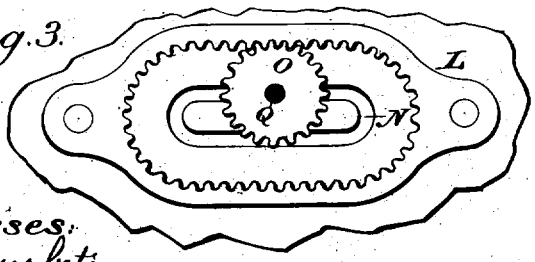
Figure 4:
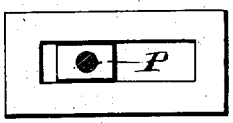

In the accompanying drawings, in which like letters of reference indicate corresponding parts, Figure 1 is a perspective view of a machine embodying my improvements; Fig. 2, a vertical longitudinal section; Fig. 3, a plan view of the mangle-motion device, showing the pinion on the inside and a guiding-groove at the bottom of the rack. Fig. 4 illustrates a detail of the slotted guide-frame for the shaft of the pinion in the mangle-motion device. Fig. 5 is a top plan view of the main bed-frame, illustrating the cross-beams and a series of rollers to support the holder or frame of the glass plate.

The letter A designates the main supporting-frame, which may be constructed of any material of sufficient strength and is of suitable size.

C indicates a pair of grooved guides placed parallel to each other upon opposite sides of the top of the frame A. These guides C receive and retain the plate-glass holder or support D in the proper plane. This plate holder or support is preferably constructed of rectangular form, and is supported at its lower side upon rollers E, journaled in suitable cross-beams in the upper portion of the frame A. The said glass frame or holder is adapted to receive a plate of glass to be polished, and is provided at its under side with the mangle-racks L L, of elliptical outline, each having corresponding grooves N N. These mangle-racks are engaged by pinions O O upon the upper ends of shafts Q Q. The teeth of the mangle-racks are made rounding or curved on their ends and in the bottom, so as to work together similar to corrugations, to prevent backlash or jerking in its operation.

P P are guide-frames constituting the upper bearing for the shafts Q Q. These shafts Q Q are supported at their lower ends in suitable sockets in the main frame, and are provided with suitable gears engaged by right and left hand worms or screws R upon a horizontal shaft, U. This shaft U is provided at one end with a spur-gear, T, engaged by a similar gear, S, upon the main driving-shaft B. The revolution of the shaft B, through the gear T, worms R, and shafts Q, causes the pinions O to revolve, which transmit their motion to the mangle-racks, giving a steady and reliable reciprocating movement to the plate-glass holder or frame. In the operation of this mechanism the shafts Q are carried from side to side by the engagement of the pinions with the teeth at either end of the mangle-rack, against which the pinion is held by the groove N, and thus they are made to engage first one side of the rack and then the other to produce the desired movements.

The letters G G designate the beams extending longitudinally of the frame, and in which the rubbers or polishers J are mounted. These beams are mounted upon the upper ends of vertical shafts K K, which are provided with eccentric cranks H, upon the wrist-pins of which the beams are journaled. The shafts K K and K′ K′ are suitably journaled at the ends of the frame, and are secured at their upper ends by means of bearing-blocks I and I′. The said shafts are provided with miter-gears X and X′, which are engaged by similar gears, W, upon horizontal shafts W′, journaled in the frame and extending longitudinally thereof. The shafts W′ are revolved by the main driving-shaft B, and for this purpose the said shafts W′ are provided with spur-gears X′, which are engaged by the spur-gear B′ on the main driving-shaft. The rubber-beams G are mounted upon the cranks H, so that they will be reciprocated simultaneously in opposite directions, which insures steadiness in the plate of glass.

The rubbers or polishers J are made of suitable size, and have their spindles journaled loosely and removably in suitable fastening-plates, *p*, which themselves are removably and adjustably secured to the beams G. The faces of these rubbers or polishers are covered with felt, in order to hold the polishing material thereon. Any number of the polishers may be provided.

Motion may be imparted to the driving-shaft B by any suitable driving means or power.

What I claim as my invention, and desire to secure by Letters Patent, is—

1. In a plate-glass-polishing machine, the combination of the beams G G, each carrying a series of loosely-journaled rubbers or polishers, J, on each side thereof, crank-shafts upon which said beams are journaled, and means for rotating said crank-shafts, the cranks upon which one beam is mounted extending in one direction, and the cranks on which the other beam is mounted being extended in the opposite direction, whereby said beams have a curvilinear reciprocating movement in opposite directions, substantially as set forth.

2. In a plate-glass-polishing machine, the combination of beams G G, each carrying a series of loosely-journaled rubbers or polishers, J, on each side thereof, crank-shafts upon which said beams are journaled, the cranks upon which one beam is journaled extending in one direction, and the cranks upon which the other beam is journaled being extended in the opposite direction, whereby said beams have a curvilinear reciprocating movement in opposite directions, means for rotating said crank shafts, a frame or support for the glass plate, and means for reciprocating said frame or support, substantially as set forth.

In testimony whereof I affix my signature in presence of two witnesses.

JAMES HASLEM.

Witnesses:
F. M. COLLINS,
E. E. OVERHOLTZER.